United States Patent Office 2,876,123
Patented Mar. 3, 1959

2,876,123

CONCRETE ADDITIVES, CONCRETE MIXTURES AND PROCESSES FOR PRODUCING SUCH MIXTURES

John V. Drummond, Washington, D. C., assignor of one-fourth to James J. Shanley, Bethesda, Md.

No Drawing. Application October 15, 1956
Serial No. 615,771

24 Claims. (Cl. 106—76)

The present invention relates to new and improved additives for concrete, to concrete mixtures including such additives and processes of producing such mixtures, and to articles of manufacture formed from such concrete mixtures. In some of its more specific aspects, the present invention is concerned with novel compositions of matter comprising additives for reducing shrinkage in concrete mixtures that include as ingredients, Portland cement or other hydraulic cements composed essentially of argillaceous and calcareous materials and with the resulting concrete mixtures and concrete articles.

Terms such as concrete or concrete mixture are broadly used in the specification and claims and, in addition to their usual meaning, are intended to include conventional materials or conventional mixtures that comprise Portland or equivalent cement as the cementing agent for fine and/or coarse aggregates such as sand or sand substitutes and gravel or gravel substitutes. Thus, the present invention is applicable to any suitable concrete mixture including Portland or equivalent cement, fine aggregate and/or coarse aggregate, such as those cement mixtures commonly referred to in the art as 1–1–2, 1–2–4 and 1–3–5 (by volume) mixtures, and to similar mixtures. The fine aggregate and/or coarse aggregate included in the above mixtures may be of the conventional type such as the usual sand and/or gravel, or of the lightweight type such as suitable lightweight sand substitutes and/or suitable lightweight coarse aggregates, as for example, expanded shale and slate. The term concrete mixture is also intended to embrace the essential ingredients of a dry concrete mix, as well as the essential ingredients of a wet concrete mix.

The quantity of water required to hydrate one cubic foot or bag (94 lbs.) of Portland cement is about 2.7 gallons. However, when preparing conventional concrete mixtures it is necessary to add an excess of water over that quantity of water required for hydration of the Portland cement in order to provide workability or plasticity in the concrete mixture. Otherwise, it is not practicable to mix, pour and work the concrete mixture into place without using heavy equipment for this purpose, such as is used in the manufacture of concrete conduits. This excess of water, i. e., the quantity of water in the mixture over that quantity of water required for hydration of the Portland cement is ordinarily thrown off by the concrete mixture during the hydration period. This excess of water released by the mixture is commonly termed the free water.

Shortly after pouring the concrete mixture and working the same into place free water is thrown off by the concrete mixture and finds its way to the surface thereby causing the formation of innumerable capillaries and voids in the hardening concrete. These capillaries and voids extend from the interior of the body of hardening concrete to the surface thereof and are therefore in communication with the exterior of the concrete body. As hydration continues, additional free water is released which also flows to the surface of the concrete thereby forming more capillaries and voids in the concrete. This elimination of free water from the concrete mixture continues until essentially all of the free water is removed from the concrete mixture.

The above-described release or "throw-off" of free water from a conventional concrete mixture results in a volumetric change in the concrete which is commonly referred to as initial shrinkage. Concrete which has high shrinkage contains innumerable capillaries and voids which are in communication with the surface of the concrete. Thus, water in contact with the surface of conventional concrete can readily reenter the concrete through the same capillaries and voids through which free water escaped during the hydration period and this in turn will result in a volume change in the cured concrete. Exposure to the elements over an extended period of time with water penetrating and leaving the concrete over many cycles, together with exposure to hot sun during the summer months and to freezing temperature during the winter months, results in eventual breakdown of the concrete as evidenced by cracking, fractures, crumbling, etc.

During the hydration of Portland cement a considerable quantity of lime is released. The lime which is gradually set free during hydration of Portland cement is commonly termed free lime. The free lime, carried as a solution of calcium hydroxide by the free water released in the concrete mixture, and later by water of penetration, tends to migrate to the concrete surface and concentrate there. This concentration of free lime at or near the concrete surface is highly detrimental, among other reasons, because it causes surface dusting of the concrete.

It may be seen from the foregoing that conventional concrete mixtures presently in use do not provide an entirely satisfactory concrete. It follows that a greatly improved concrete would result provided a satisfactory mix could be devised which would materially reduce the shrinkage in the concrete caused by throw-off of free water while at the same time materially reducing the detrimental effects of free lime produced during hydration of the cement. Although the art has been confronted with the shrinkage problem for many years, no commercially successful solution has been proposed prior to the present invention. My Patents Nos. 2,393,597 and 2,336,723 disclose compositions which have given very favorable results but my present invention constitutes a radical departure from the earlier inventions in that it achieves cured concrete of superior quality through the medium of a novel and remarkably effective additive.

I have discovered that shrinkage in concrete and the detrimental effects of free lime can be greatly reduced by including in otherwise conventional concrete mixtures small amounts of an additive consisting essentially of water swelling colloidal material and water soluble silicate.

It is an object of the present invention to provide a novel additive for concrete mixtures which will largely overcome the problems associated heretofore with shrinkage and the detrimental effect of free lime.

It is a further object of the present invention to provide a novel and improved composition of matter comprising a hydraulic cement, such as Portland cement, and an additive.

It is a still further object of the invention to provide a process for producing the foregoing novel and improved composition of the invention.

It is a still further object of the invention to provide new and improved concrete articles of manufacture.

Still other objects and advantages of the present invention will be apparent from the following detailed description.

In accordance with one important feature of the present invention, an additive is provided for concrete mixtures which comprises only two essential ingredients, viz., from ¼ to 2 parts by weight of water swelling colloidal material described herein and from 1 to 5 parts by weight of at least one water soluble silicate each in proportions based on 94 parts by weight (one cubic foot) of hydraulic cement, e. g. Portland cement. The additive is preferably prepared as a dry, finely ground mixture (e. g., 50 to 200 mesh) of the above ingredients and may be added to the ingredients of a concrete mixture at the time of preparing the concrete mixture or incorporated and packaged with the cement in the proper proportions. Where the term Portland cement is used hereinafter in the specification and claims it is intended to embrace within its meaning other suitable hydraulic cements composed essentially of argillaceous and calcareous materials.

While the above disclosed range of ingredients for the additive of the present invention will give satisfactory results for concrete mixtures useful in general applications, an additive comprising essentially from ½ to 1½ parts by weight of water swelling colloidal material and from 1½ to 3 parts by weight of water soluble silicate, each based on 94 parts by weight of Portland cement, is preferred in instances where maximum strength or reduction in shrinkage, or both, in the resulting cured concrete are of importance. Thus, this proportion of ingredients constitutes a preferred range for use in preparing structural concrete mixtures. Under optimum conditions, I have obtained excellent results when using an additive comprising essentially about 1 part by weight of water swelling colloidal material and about 2 parts by weight of water soluble silicate.

The water swelling colloidal material forming one of the two essential ingredients of the additive of the present invention is of the type forming the colloidal part of certain naturally occurring substances, such as bentonite, damonterolite, montmorillonite and ehrenbergite. The literature states that as high as 90% of bentonite is made up of this water swelling colloidal material. Other naturally occurring substances such as ehrenbergite contain 70% and up of this material. In the specification and claims, where the term "water swelling clay material" is used, it designates material of the nature of the colloidal material in bentonite and having no objectionable impurities. Assuming commercial bentonite contains about 91% water swelling colloidal material, where this specification calls for 1 part water swelling colloidal material, 1¹⁄₁₀ parts of such bentonite would be required. In like manner, 1⅓ parts of ehrenbergite having 75% of colloidal material would be required to supply the same one part water swelling colloidal material called for in this specification. Normal proportions of none-colloidal materials in commercial bentonite are not objectionable but do not contribute to the efficiency of the additive of the present invention. This is apparent from the fact that extremely fine but non-colloidal clay silicates, such as kaolin, do not function in any combination with the soluble silicates to achieve the advantages of the additive of the present invention.

Any suitable water soluble silicate is effective as an ingredient in the additive of the present invention. However, the more common water soluble silicates are restricted to silicates of the alkali metals having a $SiO_2$ to $M_2O$ ratio not greater than 4:1, where M is an alkali metal. The water soluble silicates of sodium and potassium generally give excellent results, but the silicates of sodium are generally preferred. Sodium metasilicate or water glass will give excellent results and is generally preferred over other silicates of sodium. Examples of suitable silicates include sodium metasilicate, sodium orthosilicate, sodium silicate, potassium silicate, and potassium tetrasilicate.

The weight of water soluble silicate used in accordance with the present invention is calculated as the anhydrous silicate. Thus, when sodium metasilicate is used, the weight is based upon $Na_2SiO_3$ rather than $Na_2SiO_3 \cdot 9H_2O$.

A composition for concrete in accordance with the present invention may be prepared by mixing a conventional concrete mixture including Portland cement, and then adding the above described additive in such amount as to obtain a range of from ¼ part to 2 parts by weight of water swelling colloidal material and 1 part to 5 parts by weight of water soluble silicate, with the weights of water swelling colloidal material and water soluble silicate being based upon 94 parts by weight of Portland cement in the concrete mixture. In instances where maximum strength in the resultant concrete is of importance, the percentage of water swelling colloidal material should be held within a range of from ½ part to 1½ parts by weight and the sodium silicate within a range of from 1½ parts to 3 parts by weight, each in proportions based on 94 parts by weight of Portland cement. Thus, this proportion of ingredients constitutes a preferred range for use in preparing structural concrete mixtures since the resulting cured concrete has much greater strength than conventional concrete. Within these ranges, best results may be obtained in conventional concrete mixes by using about 1 part by weight of water swelling colloidal material and about 1 part by weight of water soluble silicate, each in proportions based on 94 parts by weight of Portland cement. It is essential that both water swelling colloidal material and water soluble silicate be added to concrete mixtures prepared in accordance with the present invention. Otherwise, the beneficial effects of the present invention are not obtained and the resulting concrete exhibits the usual shrinkage and detrimental effects of free lime. No other ingredients are necessary in the additive to obtain the benefits of the present invention although other substances may be present where they do not adversely affect the cured concrete.

The additive of the present invention is especially efficacious in lightweight concrete mixtures where the same broad ranges of water swelling material and soluble silicate bring about the desired improvement in shrinkage reduction.

The concrete compositions produced in accordance with the above teachings exhibit exceptional reduction in shrinkage. In addition, the detrimental effects of free lime are also greatly reduced or even substantially eliminated. Thus, a concrete composition in accordance with the present invention that contains an optimum amount of additive has minimum shrinkage and substantially no surface dusting. As a result, the concrete composition of the present invention has an extremely long life.

While I do not wish to be bound by any theory as to the nature of the reaction or reactions which may be taking place in the concrete mixture upon addition of an additive in accordance with the present invention, it is possible to offer a reasonable explanation for the many unusual and unobvious advantages which are obtained when practicing the present invention. It is thought that the water swelling colloidal material and water soluble silicate, acting in some unknown manner in conjunction with the throw-off of free water and free lime, result in a chemical combination or combinations of these substances which forms highly and uniformly dispersed insoluble material throughout the body of cured concrete. Free water and free lime are thereby permanently held within the body of cured concrete. An equally satisfactory explanation may be offered that free lime and water soluble silicate are present in water solution as a solution in free water. This free water solution of free lime and water soluble silicate is adsorbed by the water swelling colloidal material, and free lime and water soluble silicate react in such a manner as to form a cementing agent. Particles of the water swelling colloidal material may be thereby cemented together or enclosed much in the manner of sand and gravel in a conventional concrete mix. This reaction or reactions may be thought of as resulting in a second hydration that is taking place at the same time, or more likely, shortly after the Portland cement itself is hydrating. Whatever the nature of the reaction or reactions involved, concrete mixtures prepared in accordance with the present invention result in concrete that has less shrinkage than prior art concrete. Again, the water swelling colloidal material may hold free water temporarily while free lime is being released. This would prevent escape of the free water and at the same time cause the water solutions of free lime and water soluble silicate to be more concentrated, resulting in greater conversion of free lime to insoluble silicate form. The insoluble substance would finally seal in situ water remaining in the water swelling colloidal material.

While the additive of the present invention may be prepared and used as a finely divided dry powder which is added to the ingredients of a concrete mixture at the time of preparing the concrete mixture, equally satisfactory results may be obtained by using a dry mixture containing Portland cement and the additive of the invention in the proper proportions for preparing the concrete mixture. Thus, a manufacturer of Portland cement may prepare a dry mixture containing Portland cement and the additive of the invention in propor portions, and then package and market the same as a new product for use in preparing the concrete or concrete mixture of the invention. It is also possible to prepare a dry concrete mixture which is in accordance with the present invention and then package and market the same as a new product. Such packaged dry concrete mixtures are a particularly convenient means for quickly and easily preparing small quantities of a wet concrete mix which is in accordance with the invention.

The reduced shrinkage characteristic of the concrete composition of the invention is particularly desirable for the manufacture of concrete blocks or other building elements, or for the construction of sidewalks, roads, buildings and the like. When using such concrete compositions for the above purposes, the procedure to be followed need not differ from usual practice when employing conventional concrete mixtures.

A concrete mixture (or concrete) prepared in accordance with the present invention may consist essentially of a conventional concrete mixture and an additive which consists essentially of water swelling colloidal clay material and water soluble silicate. A suitable conventional concrete mixture consists essentially of an aggregate such as sand or sand substitutes, and may include gravel or gravel substitutes, and Portland cement or equivalent hydraulic cement as a cementing agent. It is understood that sufficient water to hydrate the cement and to assure a workable plasticity is added to the concrete mixture at the time of preparing the same for pouring. In addition, other suitable materials as are conventional in the art to produce a desired end result may be present. For example, a coloring agent or dye may be present where color in the resulting concrete is desirable, or an "air entraining" agent.

While the present invention has been described herein with reference to certain specific presently preferred embodiments, it is understood that the invention may be practiced otherwise than as specifically described within the spirit and scope of the appended claims.

What is claimed is:

1. A composition of matter consisting essentially of Portland cement and an additive, the additive consisting essentially of water swelling colloidal clay material and at least one silicate selected from the class consisting of the water soluble silicates of sodium and potassium, the water swelling colloidal clay material being present within a range of ¼ part to 2 parts by weight and the water soluble silicate being present within a range of 1 part to 5 parts by weight, the weights of water swelling colloidal clay material and water soluble silicate being based upon 94 parts of Portland cement by weight.

2. The composition of claim 1 wherein the water swelling colloidal clay material is derived from bentonite.

3. The composition of claim 1 wherein the water swelling colloidal clay material is derived from bentonite and the water soluble silicate is derived from sodium metasilicate.

4. A composition of matter consisting essentially of Portland cement and an additive, the additive consisting essentially of water swelling colloidal clay material and at least one silicate selected from the class consisting of the water soluble silicates of sodium and potassium, the water swelling colloidal clay material being present within a range of ½ part to 1½ parts by weight and the water soluble silicate being present within a range of 1½ parts to 3 parts by weight, the weights of water swelling colloidal clay material and water soluble silicate being based upon 94 parts of Portland cement by weight.

5. The composition of claim 4 wherein the water swelling colloidal clay material is derived from bentonite.

6. The composition of claim 4 wherein the water swelling colloidal clay material is derived from bentonite and the water soluble silicate is derived from sodium metasilicate.

7. In a process for producing concrete, which process includes the step of producing a concrete mixture consisting essentially of an aggregate, Portland cement and water to hydrate the Portland cement, the improvement in reducing shrinkage of the concrete comprising the step of uniformly incorporating additive material, the additive material consisting essentially of water swelling colloidal clay material and at least one silicate selected from the class consisting of the water soluble silicates of sodium and potassium, the water swelling colloidal clay material being present within a range of ¼ part to 2 parts by weight and the water soluble silicate being present within a range of 1 part to 5 parts by weight, the weights of water swelling coloidal clay material and water soluble silicate being based upon 94 parts of Portland cement by weight.

8. The process of claim 7 wherein the water swelling colloidal clay material is derived from bentonite.

9. The process of claim 7 wherein the water swelling colloidal clay material is derived from bentonite and the water soluble silicate is derived from sodium metasilicate.

10. In a process for producing concrete, which process includes the step of producing a concrete mixture consisting essentially of an aggregate, Portland cement, and water to hydrate the Portland cement, the improvement in reducing shrinkage of the concrete comprising the step of uniformly incorporating additive material, the additive material consisting essentially of water swelling colloidal clay material and at least one silicate selected from the class consisting of the water soluble silicates of sodium and potassium, the water swelling colloidal clay material being present within a range of ½ part to 1½ parts by weight and the water soluble silicate being present within a range of 1½ parts to 3 parts by weight, the weights of water swelling colloidal clay material and water soluble silicate being based upon 94 parts of Portland cement by weight.

11. The process of claim 10 wherein the water swelling colloidal clay material is derived from bentonite.

12. The process of claim 10 wherein the water swelling colloidal clay material is derived from bentonite and the water soluble silicate is derived from sodium metasilicate.

13. An additive for incorporation in a concrete mixture consisting essentially of from ¼ to 2 parts by weight of water swelling colloidal clay material and from 1 to 5 parts by weight of at least one silicate selected from the class consisting of the water soluble silicates of sodium and potassium.

14. The additive of claim 13 wherein the water swelling colloidal clay material is derived from bentonite.

15. The additive of claim 13 wherein the water swelling colloidal clay material is derived from bentonite and the water soluble silicate is derived from sodium metasilicate.

16. An additive for incorporation in a concrete mixture consisting essentially of from ½ to 1½ parts by weight of water swelling colloidal clay material and from 1½ to 3 parts by weight of at least one silicate selected from the class consisting of the water soluble silicates of sodium and potassium.

17. The additive of claim 16 wherein the water swelling colloidal clay material is derived from bentonite.

18. The additive of claim 16 wherein the water swelling colloidal clay material is derived from bentonite and the water soluble silicate is derived from sodium metasilicate.

19. An article of manufacture composed of a concrete mixture consisting essentially of an aggregate, Portland cement and an additive, the additive consisting essentially of water swelling colloidal clay material and at least one silicate selected from the class consisting of the water soluble silicates of sodium and potassium, the water swelling colloidal clay material being present within a range of ¼ part to 2 parts by weight and the water soluble silicate being present within a range of 1 part to 5 parts by weight, the weights of water swelling colloidal clay material and water soluble silicate being based upon 94 parts of Portland cement by weight.

20. The article of manufacture of claim 19 wherein the water swelling colloidal clay material is derived from bentonite.

21. The article of manufacture of claim 19 wherein the water swelling colloidal clay material is derived from bentonite and the water soluble silicate is derived from sodium metasilicate.

22. An article of manufacture composed of a concrete mixture consisting essentially of an aggregate, Portland cement and an additive, the additive consisting essentially of water swelling colloidal clay material and at least one silicate selected from the class consisting of the water soluble silicates of sodium and potassium, the water swelling colloidal clay material being present within a range of ½ part to 1½ parts by weight and the water soluble silicate being present within a range of 1½ parts to 3 parts by weight, the weights of water swelling colloidal clay material and water soluble silicate being based upon 94 parts of Portland cement by weight.

23. The article of manufacture of claim 22 wherein the water swelling colloidal clay material is derived from bentonite.

24. The article of manufacture of claim 22 wherein the water swelling colloidal clay material is derived from bentonite and the water soluble silicate is derived from sodium metasilicate.

References Cited in the file of this patent

UNITED STATES PATENTS

| | | |
|---|---|---|
| Re. 17,207 | Collings | Feb. 5, 1929 |
| 1,885,731 | Kraus | Nov. 1, 1932 |
| 2,009,566 | Stowell | July 30, 1935 |
| 2,041,086 | O'Brien | May 19, 1936 |
| 2,393,597 | Drummond | Jan. 29, 1946 |
| 2,695,850 | Lorentz | Nov. 30, 1954 |
| 2,760,876 | Schulman | Aug. 28, 1956 |

OTHER REFERENCES

Page 73 of book entitled Cements, Limes and Plasters, by Eckel, 3rd ed. (1928).